United States Patent
Webster et al.

(10) Patent No.: US 6,907,550 B2
(45) Date of Patent: Jun. 14, 2005

(54) STOCHASTIC SIMULATION OF COMPUTER ACTIVITY BASED ON USER CATEGORIES

(75) Inventors: Robert Charles Webster, Auburn, WA (US); Sheetal Guttigoli, Redmond, WA (US); Dale R. Rolf, Redmond, WA (US); Steven T. Henderson, Redmond, WA (US); Ronald Craig Grumbach, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 10/086,596

(22) Filed: Feb. 28, 2002

(65) Prior Publication Data
US 2003/0163770 A1 Aug. 28, 2003

(51) Int. Cl.[7] .............................................. G06F 11/00
(52) U.S. Cl. .................................. 714/47; 702/120
(58) Field of Search ................ 714/47, 46; 702/120, 702/186

(56) References Cited

U.S. PATENT DOCUMENTS

| | | | | |
|---|---|---|---|---|
| 5,067,129 A | * | 11/1991 | Evans et al. ................. | 714/32 |
| 5,414,836 A | * | 5/1995 | Baer et al. ................... | 714/38 |
| 6,378,088 B1 | * | 4/2002 | Mongan ....................... | 714/39 |
| 6,557,120 B1 | * | 4/2003 | Nicholson et al. ............ | 714/38 |
| 2002/0178402 A1 | * | 11/2002 | Tsai ............................. | 714/38 |
| 2003/0167111 A1 | * | 9/2003 | Kipersztok et al. .......... | 701/29 |

* cited by examiner

*Primary Examiner*—Scott Baderman
*Assistant Examiner*—Paul Contino
(74) *Attorney, Agent, or Firm*—Workman Nydegger (57) ABSTRACT

Testing a computer system by simulating the computer system activity that would occur under a number of projected user patterns by navigating through a decision tree. Each of the use patterns may perform a number of standard functions (e.g., phone, email, Web, or the like) that are inherent to the computer system. For each of the projected use patterns, weights are assigned to each of the standard functions. A standard function is then selected based on the weight assigned to the standard function given the projected use pattern. Then, a probability tree is navigated to determine a particular test to implement.

21 Claims, 5 Drawing Sheets

STOCHASTIC SIMULATION OF COMPUTER ACTIVITY BASED ON USER CATEGORIES

BACKGROUND OF THE INVENTION

1. The Field of the Invention

The present invention relates to the automated testing of computer systems. More specifically, the present invention relates to methods, systems, and computer program products for stochastically measuring the reliability of a computer system based on the expected usage by a variety of different users.

2. Background and Related Art

Computing systems are available in a wide-variety of forms including desktop computers and laptop computers. Even hand-held devices such as Personal Digital Assistants (PDAs) and cellular telephones have significant general-purpose processing and memory capabilities, especially when viewed from a historical perspective. Such hand-held devices may even run sophisticated operating systems that allow for the simultaneous usage of multiple software applications.

Current operating systems and supported applications can be quite complex. In order to operate properly, each application must interact harmoniously with the operating system (and with potentially other applications) so that the computer system functions as planned. It is often impractical to expect that a first pass at coding and compiling an application will result in a perfect finished product. Even a seemingly minor programming error may introduce significant performance deviations. With typical software applications often being compiled from many thousands of lines of code, one can appreciate that even the most experienced programmer will not catch every programming error in an application in the first instance. Accordingly, computer system and software providers extensively test their product to be sure the computer system works as intended.

One conventional approach to measuring software reliability is to send a partially complete software product out to a large population of users to test the product. However, it is often expensive to create a software product (even one with partial functionality) and distribute it to a large number of users. Additionally, sending such a partially complete software product may inadvertently allow competitors an advanced view of a product thereby reducing the product's competitive advantage.

Another conventional approach to measuring computer system reliability is to internally hire and train skilled testers to systematically exercise the system to find bugs. However, this approach to testing is highly labor intensive, and thus can be time consuming and expensive. Also, the skilled testers may not run the system through the same sequence of actions that a typical user might. Accordingly, some defects in the system may go unnoticed until the system is actually in the possession of the end-user.

In another conventional testing approach, computer-executable script is drafted that causes the system to perform a series of particular actions. While this approach does not necessarily require skilled testers to systematically exercise the system, the actions caused by executing the script will not necessarily approximate how an actual end-user might use the system.

Even if a software test accurately simulates how an actual user may use a system, there are many different types of users. For example, consider a system in the form of a PDA running phone, email, and Web navigation software. A regular consumer may use the phone software most frequently, with the email and Web navigation software being used less frequently. However, a traveling businessperson may use the email software most frequently, while using the phone a little less, and using the Web navigation software least of all. Accordingly, different user segments may use a system in dramatically different ways. Thus, even if a technique accurately tests a given user's use of the system, the technique may not be accurate for all users of the system.

Accordingly, what is desired are methods, systems, and computer program products for more realistically simulating system performance.

BRIEF SUMMARY OF THE INVENTION

The principles of the present invention provide for testing a computer system by simulating the computer system activity that would occur as it experiences a projected use pattern. The computer system may accomplish this for a number of projected use patterns. For example, suppose that a particular computer system is quite general purpose so as to be attractive to multiple market segments (e.g., students, leisure travelers, business persons, gamers, or the like). Some of these market segments may use the computer system predominantly for making telephone calls, with only some attention to email or Web access. Other market segments may be more interested in email, and less at Web access.

Different use patterns will sometimes give rise to different failure mechanisms. Accordingly, if one single use pattern is used to simulate user activity, one might overlook a number of failure mechanisms that might have been fixed if detected. The present invention allows for testing using a wide variety of projected use patterns thereby increasing the chance that faults in the computer system will be detected and corrected prior to marketing the product.

The present invention may accomplish this by navigating through a decision tree. Each of the use patterns may perform a number of standard functions that are inherent to the computer system. For example, such standard functions may include a phone, email, and web function in the case of a Personal Digital Assistant (PDA) or Internet-enabled mobile telephone. For each of the projected use patterns, weights are assigned to each of the standard functions. The weights represent the chance that a test from a particular standard function will be performed given a particular projected use pattern.

A standard function is then selected based on the weight assigned to the standard function given the projected use pattern. Then, a probability tree is navigated to determine a particular test to implement. For example, in the case of a phone standard function, available tests might include calling directly from a contacts list, calling by dialing numbers, dialing a busy line, or other phone-base activities.

Accordingly, by navigating the decision tree for a number of project use patterns, the system may be tested for a wider range of users. In this way, defects that would have normally occurred during a wide range of usage patterns will be more likely detected and corrected instead of being discovered by the end-user.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for testing a computer system by simulating the computer system activity that would occur as it experiences a projected use pattern. The computer system may accomplish this for a number of projected use patterns. Different use patterns will sometimes give rise to different failure mechanisms. Accordingly, if one single use pattern is used to simulate user activity, one might overlook a number of failure mechanisms that might have been fixed if detected. The present invention allows for testing using a wide variety of projected use patterns.

The present invention may accomplish this by navigating through a decision tree. Each of the use patterns may perform a number of standard functions (e.g., phone, email, Web, or the like) that are inherent to the computer system. For each of the projected use patterns, weights are assigned to each of the standard functions. A standard function is then selected based on the weight assigned to the standard function given the projected use pattern. Then, a probability tree is navigated to determine a particular test to implement.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 1:
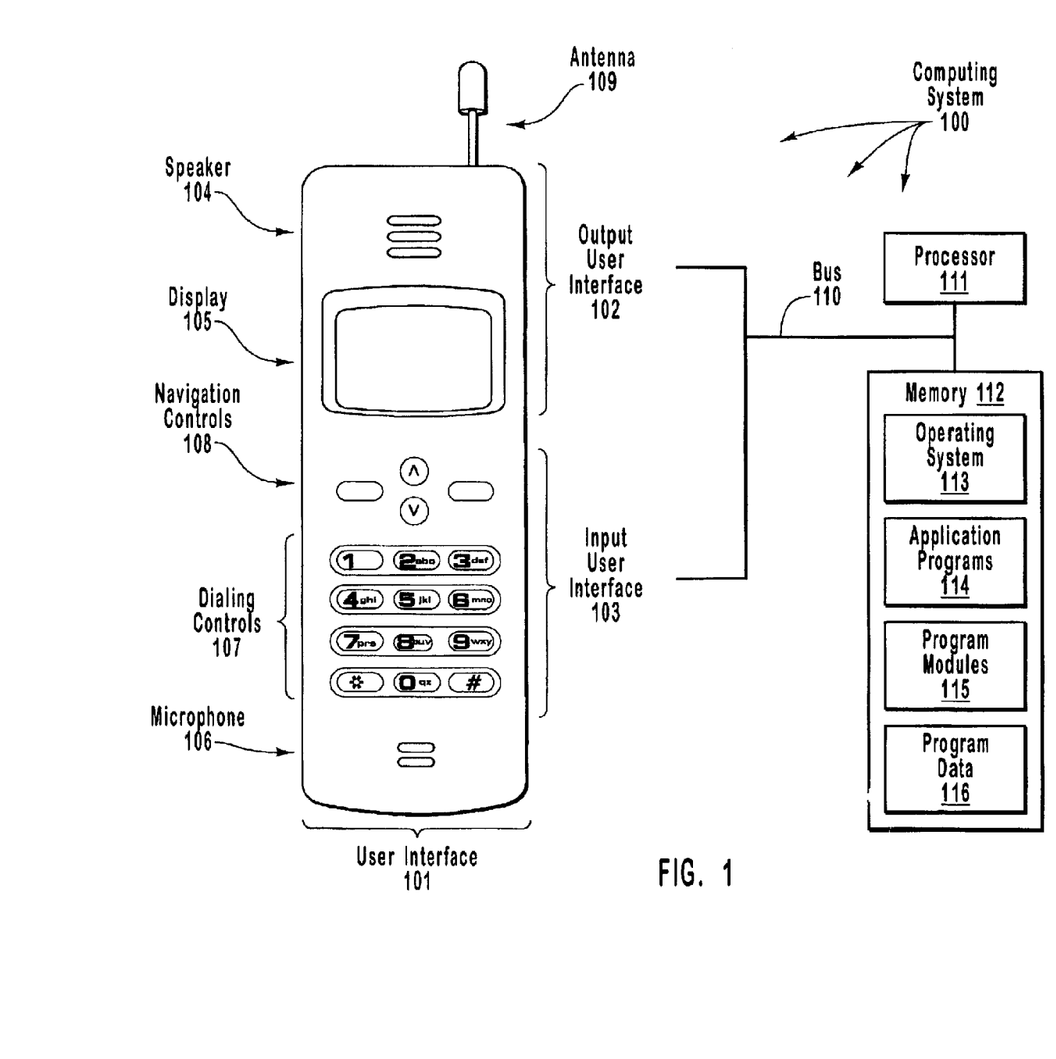
FIG. 1 represents a computer system in the form of a mobile computing device that represents a suitable operating environment for the present invention.

FIG. 1 illustrates a computing system 100 that includes a user interface 101 for allowing a user to input information through an input user interface 103, and review information presented via an output user interface 102. For example, the output user interface 102 includes a speaker 104 for presenting audio information to the user, as well as a display 105 for presenting visual information to the user. The computing system 100 also has an antenna 109 for wireless communication over a wireless link.

The input user interface 103 may include a microphone 106 for rendering audio information into electronic form. In addition, the input user interface 103 includes dialing controls 107 represented by 12 buttons through which a user may dial a telephone number, enter a text message, or instruct the computing system 100 to send a data message. Input user interface 103 also includes navigation control buttons 108 that assist the user in navigating through various entries and options that may be listed on display 105.

Although the computing system 100 has the appearance of a mobile telephone, the unseen features of the computing system 100 may allow for complex and flexible general-purpose processing capabilities. For example, the computing system 100 also includes a processor 111 and a memory 112 that are connected to each other and to the user interface 101 via a bus 110. The memory 112 generically represents a wide variety of volatile and/or non-volatile memories that may be employed. The particular type of memory used in the computing system 100 is not important to the present invention.

Program code means comprising one or more program modules may be stored in memory 112. The one of more program modules may include an operating system 113, one or more application programs 114, other program modules 115, and program data 116. The environment illustrated in FIG. 1 is illustrative only, and by no means represents even a small portion of the wide variety of computing devices in which the principles of the present invention may be implemented.

For example, although the computing system 100 is illustrated as being a mobile telephone, any at least partially general-purpose processing system may employ the principles of the present invention. For example, Personal Digital Assistants (PDAs), laptop desktop computers, and computer networks may perform the methods described herein.

Figure 2:
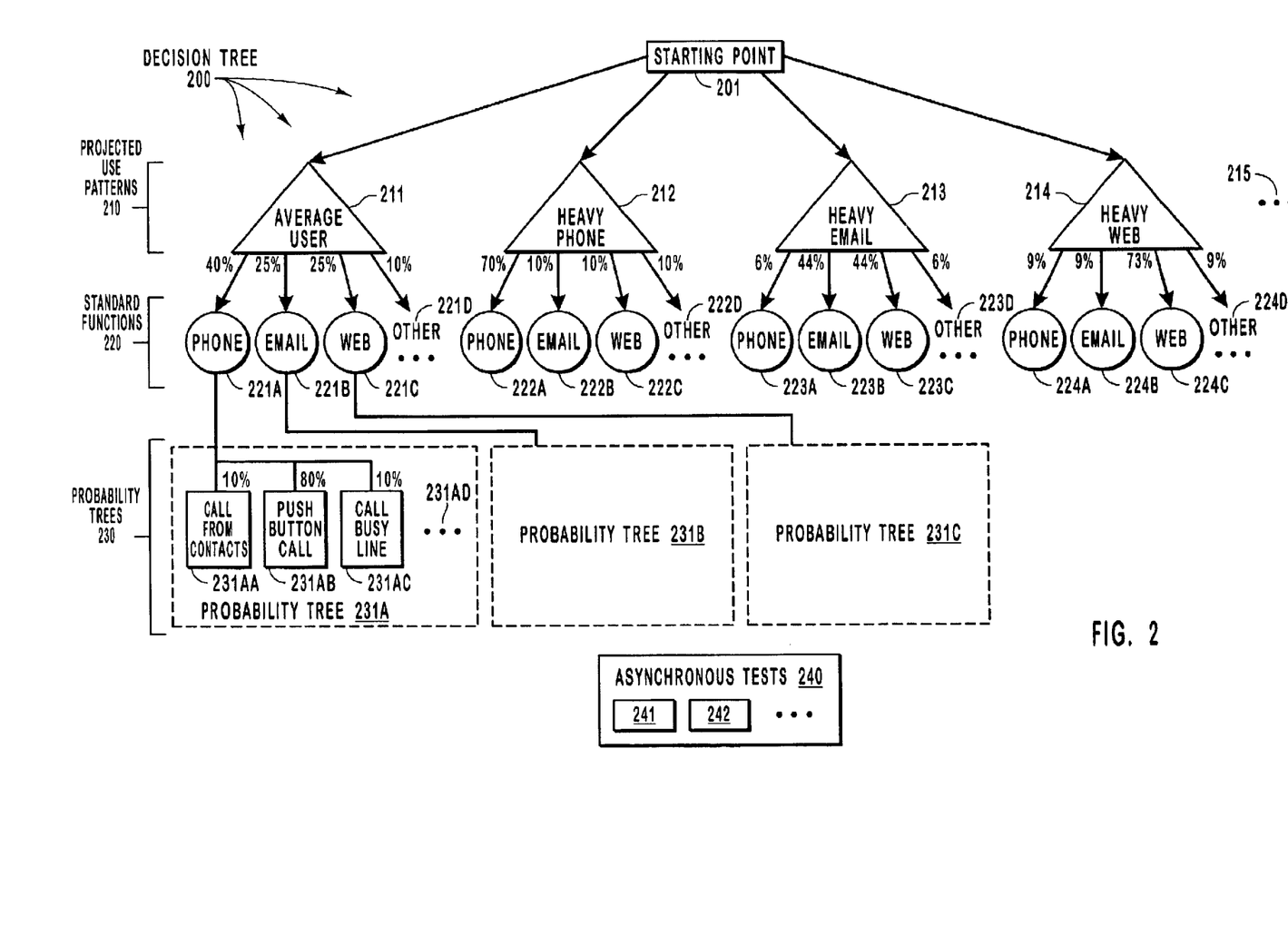
FIG. 2 schematically illustrates a decision tree that may be navigated in order to test the computer system for a number of different project use patterns.

FIG. 2 illustrates a decision tree 200 that the computer system 100 may navigate in order to test the interoperability of the various modules that run on the computer system 100 such as, for example, the operating system 113, the application programs 114, or the program modules 115. The navigation of the decision tree 200 will be described with frequent reference to FIG. 3, which illustrates a flowchart of a method 300 for testing a computer system that has a number of projected use patterns.

The decision tree 200 includes a starting point 201 where the navigation begins. It may be anticipated that the computing system 100 is going to be used by a wide variety of users having a wide variety of needs. Accordingly, the computing system 100 can be expected to experience a variety of projected use patterns. In FIG. 2, the projected use patterns 210 are represented by triangular nodes in the decision tree 200. In the illustrated example, such projected use patterns include an "Average User" use pattern 211, a "Heavy Phone" use pattern 212, a "Heavy Email" use pattern 213, and a "Heavy Web" use pattern 214.

The different use patterns may have been determined based on information as extensive as marketing surveys, or even information such as a simple educated guess on how a particular computer system will be used. It is possible, or even likely, that projected use patterns may differ depending on the nature of the computer system. The example projected use patterns may be suitable for a PDA with phone and Internet access capabilities, or a mobile phone with Internet access capabilities, although the present invention is not so limited. The decision tree 200 includes horizontal ellipses 215 that represent other projected use patterns thereby emphasizing that the principles of the present invention are by no means limited to the illustrated projected use patterns.

For each projected use pattern, there are a number of standard functions 220 that may be performed. Each standard function 220 is represented by a circular node in the decision tree 200. For example, the "Average User" projected use pattern 211 has a "Phone" standard function 221A, an "Email" standard function 221B and a "Web" standard function 221C, among potentially other as represented by horizontal ellipses 211D. The standard functions represent high-level functional operations whose usage may vary across different projected use patterns.

Since the testing occurs on a given computer system, the standard functions may often be the same across all of the projected use patterns. Accordingly, the principles of the present invention are described with the standard functions being the same across all of the projected use patterns, although the invention is not so limited. For example, Heavy Phone projected use pattern 212 also includes a Phone standard function 222A, an Email standard function 222B and a Web standard function 222C, among others 222D. Likewise, Heavy Email projected use pattern 213 includes a Phone standard function 223A, an Email standard function 223B and a Web standard function 223C, among others 223D. Also, Heavy Web projected use pattern 214 includes a Phone standard function 224A, an Email standard function 224B and a Web standard function 224C, among others 224D.

Each of the standard functions may have a number of possible tests that may be performed once the test navigates to the standard function. The test that is actually performed may be determined from a probability tree. The decision tree 200 includes a number of probability trees 230 including a phone probability tree 231A for the phone standard function 221A, an Email probability tree 231B for the Email standard function 221B, and a Calendar probability tree 231C for the Calendar standard function 221C. For clarity, the other probability trees corresponding to the standard functions for the "Heavy Phone" projected use pattern 212, the "Heavy Email" projected use pattern 213, and the "Heavy Web" projected use pattern 214 are not shown.

The structure of the probability tree may be sophisticated including a number of hierarchical nodes and branches, or may be relatively straightforward as is illustrated for probability tree 231A. The probability tree 231A includes a "Call From Contacts" test 231AA, "Push Button Call" test 231AB, a "Call Busy Line" test 231AC, among others 231AD. The tests are the terminating nodes in the decision tree 200 and are represented as square nodes. The tests may be any form of computer-executable code including scripts, such as an executable file or a script file.

Figure 3:
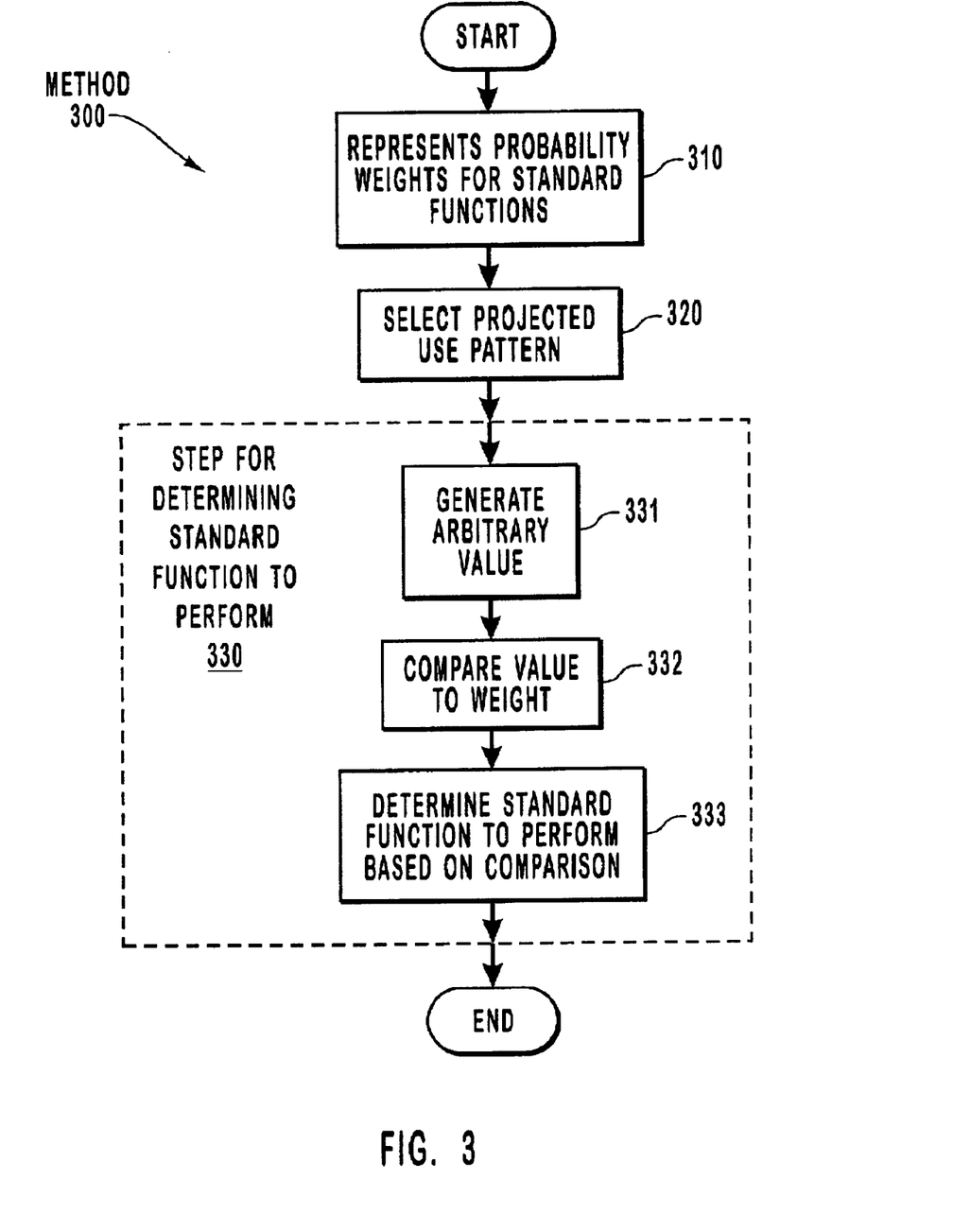
FIG. 3 illustrates a flowchart of a method for testing a computer system that has a number of project use patterns.

FIG. 3 illustrates a flowchart of a method 300 for testing the computer system 100. The method 300 includes an act of representing weights for the standard functions for each of the plurality of use patterns (act 310). For example, referring the Average User projected use pattern 211 in FIG. 2, the standard functions 221A, 221B, 221C, and 221D have corresponding weights 40%, 25%, 25%, and 10%, respectively. This means that when the Average User projected use pattern 211 is selected, 40% of the tests performed during the simulation will be from the Phone standard function 221A, 25% from the Email standard function 221B, 25% from the Web standard function 221C, and 10% from the other standard functions 221D. Likewise, the Heavy Phone projected use pattern 212 has respective weights 70%, 10%, 10% and 10% indicating heavy emphasis on tests from the Phone standard function 222A. Also, the Heavy Email projected use pattern 213 has respective weights 6%, 44%, 44% and 6% indicating heavy emphasis on tests from the Email standard function 223B and Web standard function 223C. Finally, the Heavy Web projected use pattern 214 has respective weights 9%, 9%, 73% and 9% indicating heavy emphasis on tests from the Web standard function 224C.

Referring to FIG. 3, one of the projected use patterns is then selected (act 320). The computing system 100 may make this selection after having received a specific user instruction, in response to a preprogrammed instruction, or on its own initiative based on decision-making logic. Suppose in this example, that the computing system 100 has selected the Average User projected use pattern 211.

Then, the computing system 100 determines which standard function category to perform (step 330) based on the probability weight corresponding to the standard function for the selected projected use pattern. This functional step may be accomplished via any corresponding acts that accomplish the specified function. However, in the illustrated embodiment, this functional step is accomplished via specific corresponding acts 331, 332 and 333.

In particular, the computing system 100 may generate an arbitrary value (act 331) via, for example, a pseudo random number generator. Next, the arbitrary value (or a value derived therefrom) is compared to the probability weight assigned to the particular standard function (act 332). Then, it is determined based on the comparison that the particular standard function is to be performed (act 333). For example, suppose that the arbitrary value is a whole number between 1 and 100, inclusive. For the Average User project use pattern 211, if the number is between 1 and 40, inclusive, a test from the Phone standard function 221A is performed. If the number is between 40 and 65, inclusive, a test from the Email standard function 221B is performed. If the number is between 66 and 90, inclusive, a test from the Web standard function 221C is performed. If the number is between 91 and 100, inclusive, a test from one of the other standard functions 221D is performed.

Suppose that the navigation process travels to the Phone standard function 221 A. The navigation would then proceed through the probability tree 231A until a test is performed. In this probability tree, a probability weight is assigned to each test. For example, the Call From Contacts test 231AA has a weight of 10%, the Push Button Call test 231AB has a weight of 80%, and the Call Busy Line test 231AC has a weight of 10%. Thus, when the Average User projected use pattern 211 is selected, and the phone standard function 221A is navigated to, a call will be placed by pushing number buttons 80% of the time, a call will be placed directly from a contacts list selection 10% of the time, and a busy signal will be encountered 10% of the times for a total of 100%. Note that other tests 231AD do not show a probability, implying a zero probability of occurrence for other tests 231AD in the projected use pattern, which may be an indication that the probability is unknown, and therefore for purposes of testing is implied to be zero.

Not all processes performed by the computing system 100 will be in response to user activity. Some processes will occur regardless of user activity. For example, the user may receive a Short Text Messaging (SMS) message while making a phone call. Such processes are often termed asynchronous since they are not necessarily synchronous with user activity, but may occur at any time. Accordingly, the decision tree 200 also includes asynchronous tests 240 such as tests 241 and 242 that may occur at any point during the simulation.

Figure 4:
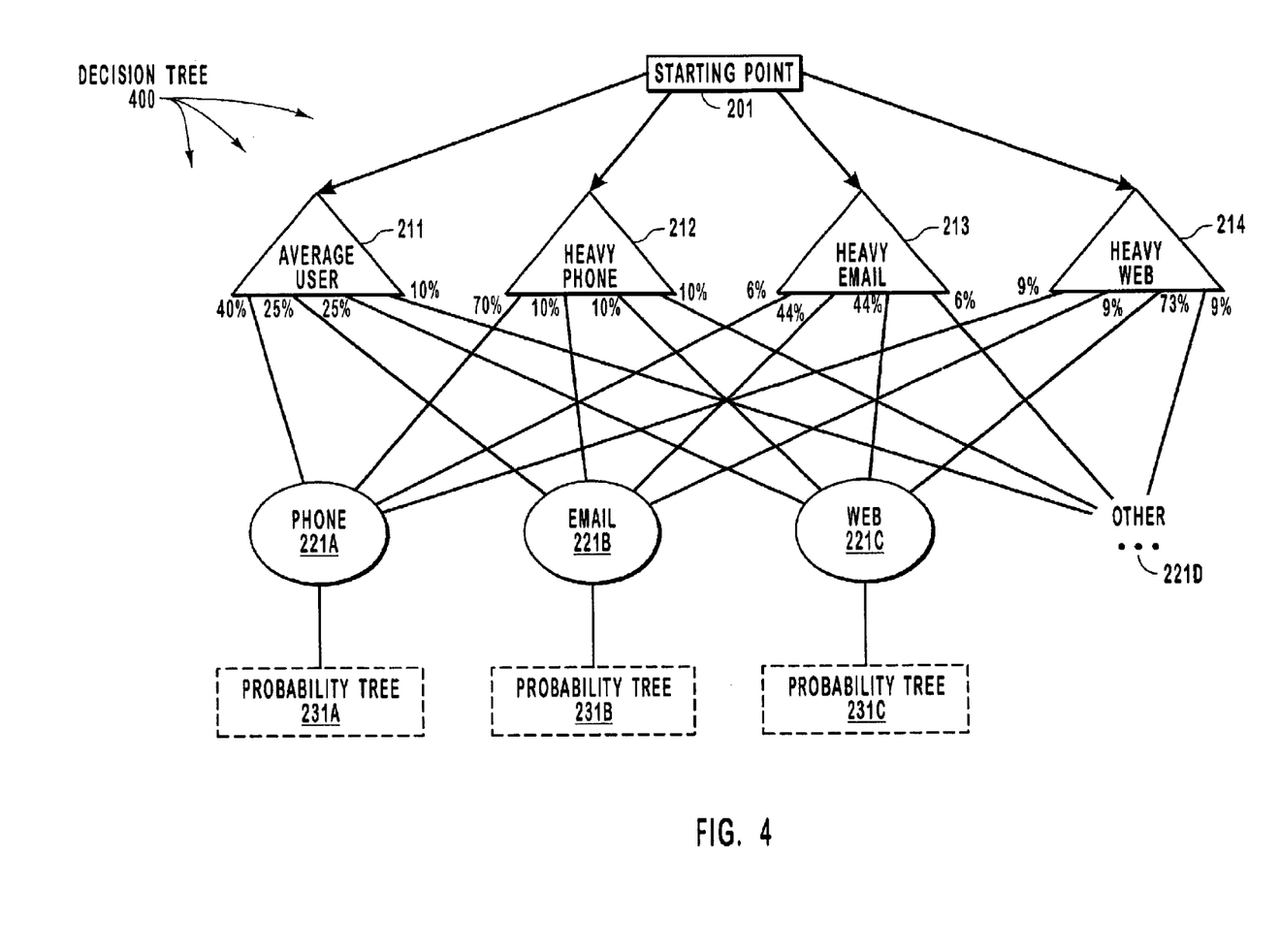
FIG. 4 schematically illustrates a decision tree with redundant nodes merged.

In some instances, the decision tree will be the same for each projected use pattern except for the weights assigned to the standard functions. The probability tree for each standard function as well as the tests available might be the same. In that case, the decision tree of FIG. 2 may be simplified to merge redundant nodes as illustrated in the decision tree 400 of FIG. 4. In that case, the nodes previously descendant from the Heavy Phone projected use pattern 212, the Heavy Email projected use pattern 213 and the Heavy Web projected use pattern 214 are merged with the nodes that descend from the Average User projected use pattern 211.

Figure 5:
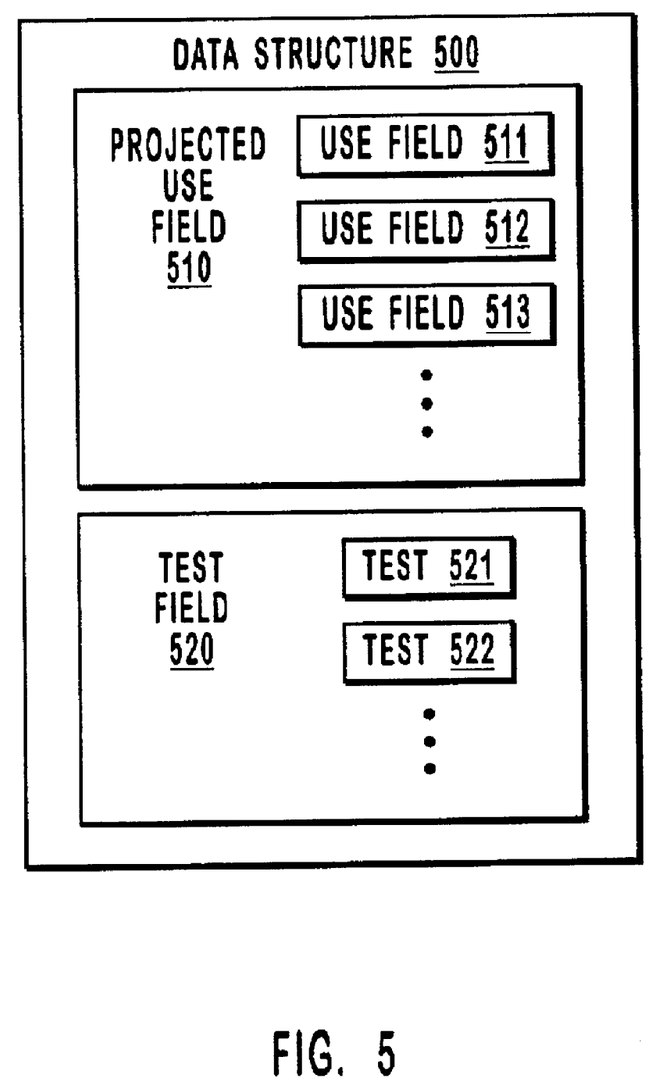
FIG. 5 illustrates a data structure that may be used to generate the decision tree of FIG. 2.

FIG. 5 illustrates an example data structure 500 that may be used to form the decision tree 200. The data structure may be, for example, a registry structure having a root of, for example, [HKEY_LOCAL_MACHINE\SOFTWARE\Testing\Switcher]. The example data structure 500 may include, for example, a projected use field 510 that includes a number of projected use patterns fields 511, 512, 513, and so forth. Also, the example data structure 500 includes a test field 520 that includes test definitions such as test definition 521, 522 and so forth.

This structure may be restated as follows:

```
Profiles
    <pname-a>=<prob-a-1>,<prob-a-2>,<prob-a-3> . . .
    <pname-b>=<prob-b-1>,<prob-b-2>,<prob-b-3> . . .
    <pname-c>=<prob-c-1>,<prob-c-2>,<prob-c-3> . . .
    .
    .
    .
Tests
    S1
        <S1-tname-a>=<prob-a>,<cmd-a-1>,<cmd-a-2> . . .
        <S1-tname-b>=<prob-b>,<cmd-b-1>,<cmd-b-2> . . .
        <S1-tname-c>=<prob-c>,<cmd-c-1>,<cmd-c-2> . . .
        .
        .
        .
    S2
        <S2-tname-a>=<prob-a>,<cmd-a-1>,<cmd-a-2> . . .
        <S2-tname-b>=<prob-b>,<cmd-b-1>,<cmd-b-2> . . .
        <S2-tname-c>=<prob-c>,<cmd-c-1>,<cmd-c-2> . . .
        .
        .
        .
```

In this example structure, <pname-n> is the name of the projected use pattern n, where n is the value of that name. <prob-n-m> is the probability of a standard function m being selected given the projected use pattern n. Sm represents the standard function m. <Sm-tname-p> represents the test name p for the standard function m. <prob-p> represents the probability of selecting the test p given the standard function. <cmd-p-q> represents the q'th command of the test p.

The following is a specific example of such registry data structure:

[HKEY_LOCAL_MACHINE\SOFTWARE\TESTING]
[HKEY_LOCAL_MACHINE\SOFTWARE\TESTING\Switcher]
[HKEY_LOCAL_MACHINE\SOFTWARE\TESTING\Switcher\Profiles]
"Average User"="40,25,25,10"
"Heavy Phone"="70,10,10,10"
"Heavy Email"="10,80,80,10"
"Heavy Web"="10,10,80,10"
[HKEY_LOCAL_MACHINE\SOFTWARE\TESTING\Switcher\Tests]
[HKEY_LOCAL_MACHINE\SOFTWARE\TESTING\Switcher\Tests\S1]
"Dialer"="10,sertest switcher_dialer.txt"
"Work"="20,-mytest setup,sertes work.txt,mytest shutdown"
[HKEY_LOCAL_MACHINE\SOFTWARE\TESTING\Switcher\Tests\S2]
"In Folders"="10,sertest switcher_inbox_folders.txt"
"In IMAP"="30, sertest switcher_inbox_imap.txt"
"In Add Sender"="25,sertest switcher_inbox_addsender.txt"
[HKEY_LOCAL_MACHINE\SOFTWARE\TESTING\Switcher\Tests\S3]
"Pie"="25,sertest switcher_pit.txt"
"Pie Random"="30,sertest switcher_pie_random.txt"
[HKEY_LOCAL_MACHINE\SOFTWARE\TESTING\Switcher\Tests\S4]
"Monkey"="23,cemonkey/r5/d"

"CE MAPI"="35,cemapi-i 1-t2-r"
"Stress 5"="2, stress5 0 1 5"

In this example, the names of the specific tests (Dialer, Work, In Folders, In IMAP, In Add Sender, Pie, Pie Random, Monkey, CE MAPI, and Stress 5) are arbitrary and may be replaced by any desired test name.

Accordingly, the principles of the present invention allows for the testing of a computing system by simulating computing activity that occurs under a wide variety of projected use patterns. Thus, the stability of the computer system is more assured for a more realistic cross section of users.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. In a computer system that is configured to run one or more software modules, a method for testing the functionality of the one or more software modules as executed on the computer system as the computer system interfaces with a projected use pattern, the one or more software modules capable of performing a plurality of standard functions, the method comprising the following:

an act of determining a plurality of projected use patterns, each based on information regarding how the one or more software modules will be used by different types of users;

an act of representing probability weights for at least one of the plurality of standard functions for each of the plurality of use patterns;

an act of a selecting one of the plurality of projected use patterns for testing, the selected use pattern having a probability weight assigned to each of a plurality of standard functions that may be performed as the computer system interfaces with the selected projected use pattern; and a step for determining a standard function to perform based on the probability weight corresponding to the standard function for the selected projected use pattern.

2. A method in accordance with claim 1, wherein at least some of the probability weights are implicit.

3. A method in accordance with claim 2, wherein at least one of the standard functions for at least one of the plurality of projected use patterns lacks a probability weight to imply a zero probability of occurrence for that standard function for that projected use pattern.

4. A method in accordance with claim 2, wherein at least one of the standard functions for at least one of the plurality of projected use patterns lacks a probability weight to imply an unknown zero probability of occurrence for that standard function for that projected use pattern.

5. A method in accordance with claim 1, wherein the act of representing probability weights for at least one of the plurality of standard functions for each of the plurality of use patterns comprises the following:

an act of representing probability weights for at least a phone function for each of the plurality of projected use patterns.

6. A method in accordance with claim 1, wherein the act of representing probability weights for at least one of the plurality of standard functions for each of the plurality of use patterns comprises the following:

an act of representing probability weights for at least an email function for each of the plurality of projected use patterns.

7. A method in accordance with claim 1, wherein the act of representing probability weights for at least one of the plurality of standard functions for each of the plurality of use patterns comprises the following:

an act of representing probability weights for at least a Web function for each of the plurality of projected use patterns.

8. A method in accordance with claim 1, wherein the act of selecting one of the plurality of projected use patterns for testing comprises the following:

an act of receiving a user selection of one of the plurality of projected use patterns for testing.

9. A method in accordance with claim 1, wherein the step for determining a standard function to perform comprises the following:

an act of generating an arbitrary value;

an act of comparing the arbitrary value to the probability weight, or a value derived from the probability weight, assigned to the standard function; and an act of determining that the standard function is to be performed based on the comparison.

10. In a computer system that is configured to run one or more software modules, a method for testing the functionality of the one or more software modules as executed on the computer system as the computer system interfaces with one of a plurality of projected use patterns, the one or more software modules capable of performing a plurality of standard functions, the method comprising the following:

an act of determining a plurality of projected use patterns, each based on information regarding how the one or mote software modules will be used by different types of users;

an act of representing probability weights for at least one of the plurality of standard functions for each of the plurality of use patterns;

an act of a selecting one of the plurality of projected use patterns for testing, the selected use pattern having a probability weight assigned to each of a plurality of standard functions that may be performed as the computer system interfaces with the selected projected use pattern;

an act of generating an arbitrary value;

an act of comparing the arbitrary value to the probability weight, or a value derived from the probability weight, assigned to a particular standard function; and an act of determining that the particular standard function is to be performed based on the comparison.

11. A method in accordance with claim 10, wherein the act of representing probability weights for at least one of the plurality of standard functions for each of the plurality of use patterns comprises the following:

an act of representing probability weights for at least a phone function for each of the plurality of projected use patterns.

12. A method in accordance with claim 10, wherein the act of representing probability weights for at least one of the plurality of standard functions for each of the plurality of use patterns comprises the following:

an act of representing probability weights for at least an email function for each of the plurality of projected use patterns.

13. A method in accordance with claim 10, wherein the act of representing probability weights for at least one of the plurality of standard functions for each of the plurality of use patterns comprises the following:

an act of representing probability weights for at least a Web function for each of the plurality of projected use patterns.

14. A method in accordance with claim 10, wherein the act of selecting one of the plurality of projected use patterns for testing comprises the following:

an act of receiving user selection of one of the plurality of projected use patterns for testing.

15. A method in accordance with claim 10, further comprising the following:

an act of representing a plurality of tests that may be performed in response to determining that the particular standard function is to be performed.

16. A method in accordance with claim 15, wherein the act of representing a plurality of tests that may be performed comprises the following:

an act of representing each of the plurality of test as an executable file.

17. A method in accordance with claim 15, wherein the act of representing a plurality of tests that may be performed comprises the following.

an act of representing each of the plurality of test as a script file.

18. A method in accordance with claim 15, wherein the act of representing a plurality of tests that may be performed comprises an act of representing each of the plurality of test as an executable file, the method further comprising the following:

an act of determining a particular executable file to execute by navigating a probability tree associated with the particular standard function for the selected projected use.

19. A method in accordance with claim 18, wherein the particular probability tree is common for the particular standard function across all of the projected use patterns.

20. A method in accordance with claim 18, wherein the particular probability tree is different for the particular standard function for at least some of the projected use patterns.

21. A computer program product for use in a computer system that is configured to run one or more software modules, the computer program product for implementing a method for testing the functionality of the one or more software modules as executed on the computer system as the computer system interfaces with one of a plurality of projected use patterns, the one or more software modules capable of performing a plurality of standard functions, the computer system representing probability weights for at least one of the plurality of standard functions, the computer program product comprising one or more computer-readable media having stored thereon the following:

computer executable instructions for determining a plurality of projected use patterns, each based on information regarding how the one or more software modules will be used by different types of users;

computer-executable instructions for selecting one of the plurality of projected use patterns for testing, the selected use pattern having a probability weight assigned to each of a plurality of standard functions that may be performed as the computer system interfaces with the selected projected use pattern;

computer-executable instructions for causing an arbitrary value to be generated;

computer-executable instructions for comparing the arbitrary value to the probability weight, or a value derived from the probability weight, assigned to a particular standard function; and computer-executable instructions for determining that the particular standard function is to be performed based on the comparison.

* * * * *